(12) United States Patent
Youn et al.

(10) Patent No.: US 11,444,273 B2
(45) Date of Patent: Sep. 13, 2022

(54) METHOD FOR MANUFACTURING LITHIUM ELECTRODE

(71) Applicant: LG CHEM, LTD., Seoul (KR)

(72) Inventors: Suk Il Youn, Daejeon (KR);
Byoungkuk Son, Daejeon (KR);
Junghun Choi, Daejeon (KR);
Minchul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 137 days.

(21) Appl. No.: 16/467,923

(22) PCT Filed: Jul. 4, 2018

(86) PCT No.: PCT/KR2018/007577
§ 371 (c)(1),
(2) Date: Jun. 7, 2019

(87) PCT Pub. No.: WO2019/022403
PCT Pub. Date: Jan. 31, 2019

(65) Prior Publication Data
US 2019/0372101 A1    Dec. 5, 2019

(30) Foreign Application Priority Data

Jul. 26, 2017  (KR) .................. 10-2017-0094471

(51) Int. Cl.
*H01M 4/04* (2006.01)
*H01M 4/62* (2006.01)
(Continued)

(52) U.S. Cl.
CPC ....... *H01M 4/1395* (2013.01); *H01M 4/0404* (2013.01); *H01M 4/0423* (2013.01);
(Continued)

(58) Field of Classification Search
CPC ............ H01M 4/1395; H01M 4/0404; H01M 4/0423; H01M 4/0428; H01M 4/628;
(Continued)

(56) References Cited

U.S. PATENT DOCUMENTS 6,214,061 B1   4/2001 Visco et al.
6,413,284 B1   7/2002 Chu et al.
(Continued)

FOREIGN PATENT DOCUMENTS

CN   104103809 A   10/2014
CN   105051944 A   11/2015
(Continued)

OTHER PUBLICATIONS

Machine translation of JP2013020974 originally published to Honda et al. on Jan. 31, 2013. (Year: 2013).*
(Continued)

*Primary Examiner* — Christian Roldan
(74) *Attorney, Agent, or Firm* — Birch, Stewart, Kolasch & Birch, LLP

(57) ABSTRACT

A method for preparing a lithium electrode, and in particular, a lithium electrode having a thin and uniform thickness may be prepared by forming a protective layer capable of protecting lithium metal on a substrate first, depositing lithium metal on the protective layer, and then transferring the deposited lithium metal layer on a current collector, for instance a Cu current collector, when preparing a lithium electrode, and a lithium secondary battery using the lithium electrode prepared as above may have enhanced energy density.

7 Claims, 1 Drawing Sheet

(51) Int. Cl.
*H01M 4/02* (2006.01)
*H01M 4/38* (2006.01)
*H01M 4/66* (2006.01)
*H01M 4/1395* (2010.01)
*H01M 10/0525* (2010.01)
*H01M 10/0565* (2010.01)

(52) U.S. Cl.
CPC ......... *H01M 4/0428* (2013.01); *H01M 4/628* (2013.01); *H01M 4/66* (2013.01); *H01M 10/0525* (2013.01); *H01M 10/0565* (2013.01); *H01M 2004/021* (2013.01); *H01M 2004/027* (2013.01)

(58) Field of Classification Search
CPC ............... H01M 4/66; H01M 10/0525; H01M 10/0565; H01M 2004/021; H01M 2004/027; H01M 4/04; H01M 4/0402; H01M 4/0421; H01M 4/661; Y02E 60/10
USPC ........................................................ 429/231
See application file for complete search history.

(56) References Cited

U.S. PATENT DOCUMENTS

| | | |
|---|---|---|
| 6,413,285 B1 | 7/2002 | Chu et al. |
| 6,432,584 B1 | 8/2002 | Visco et al. |
| 6,911,280 B1 | 6/2005 | De Jonghe et al. |
| 2002/0034688 A1* | 3/2002 | Chu ............... H01M 4/0404 429/232 |
| 2004/0072066 A1 | 4/2004 | Cho et al. |
| 2005/0079420 A1* | 4/2005 | Cho ............... H01M 4/0402 429/231.95 |
| 2005/0282919 A1* | 12/2005 | Cao ............... H01M 4/881 521/27 |
| 2011/0176255 A1* | 7/2011 | Sasaki ............... H01G 11/86 361/502 |
| 2011/0177398 A1* | 7/2011 | Affinito ............... H01M 4/405 429/325 |
| 2014/0272565 A1 | 9/2014 | Gronwald et al. |
| 2014/0272594 A1* | 9/2014 | Safont Sempere ... H01M 4/134 429/231.95 |
| 2014/0272597 A1* | 9/2014 | Mikhaylik ......... H01M 10/0565 429/233 |
| 2016/0149212 A1 | 5/2016 | Zaghib et al. |
| 2017/0062829 A1 | 3/2017 | Ryu et al. |
| 2017/0331156 A1* | 11/2017 | Visco .................... H01M 4/382 |
| 2018/0051137 A1 | 2/2018 | Kim et al. |
| 2019/0013546 A1* | 1/2019 | Visco ................ H01M 10/0525 |

FOREIGN PATENT DOCUMENTS

| | | | |
|---|---|---|---|
| CN | 105190969 A | 12/2015 | |
| CN | 106654172 A | 5/2017 | |
| CN | 106784840 A | 5/2017 | |
| JP | 10-289708 A | 10/1998 | |
| JP | 2004-134403 A3 | 4/2004 | |
| JP | 2007-265733 A | 10/2007 | |
| JP | 2007-273459 A | 10/2007 | |
| JP | 2013-20974 A | 1/2013 | |
| JP | 2013020974 A * | 1/2013 | |
| JP | 2013-91278 A | 5/2013 | |
| KR | 10-2001-0043145 A | 5/2001 | |
| KR | 10-2005-0019483 A | 3/2005 | |
| KR | 10-0635684 B1 | 10/2006 | |
| KR | 10-2015-0101808 A | 9/2015 | |
| KR | 10-2015-0132427 A | 11/2015 | |
| KR | 10-2016-0037488 A | 4/2016 | |
| KR | 10-2016-0037610 A | 4/2016 | |
| KR | 20160037488 A * | 4/2016 | |
| KR | 10-2017-0026098 A | 3/2017 | |
| KR | 10-2017-0086002 A | 7/2017 | |
| WO | WO 2014/142953 A1 | 9/2014 | |
| WO | WO-2015019063 A1 * | 2/2015 | ............ B05D 3/144 |
| WO | WO 2017/104867 A1 | 6/2017 | |

OTHER PUBLICATIONS

Machine translation of KR1020160037488 originally published to Kim et al. on Apr. 6, 2016. (Year: 2016).*
Extended European Search Report, dated Jan. 14, 2020, for European Application No. 18837358.3.
International Search Report for PCT/KR2018/007577 (PCT/ISA/210) dated Dec. 10, 2018.

* cited by examiner

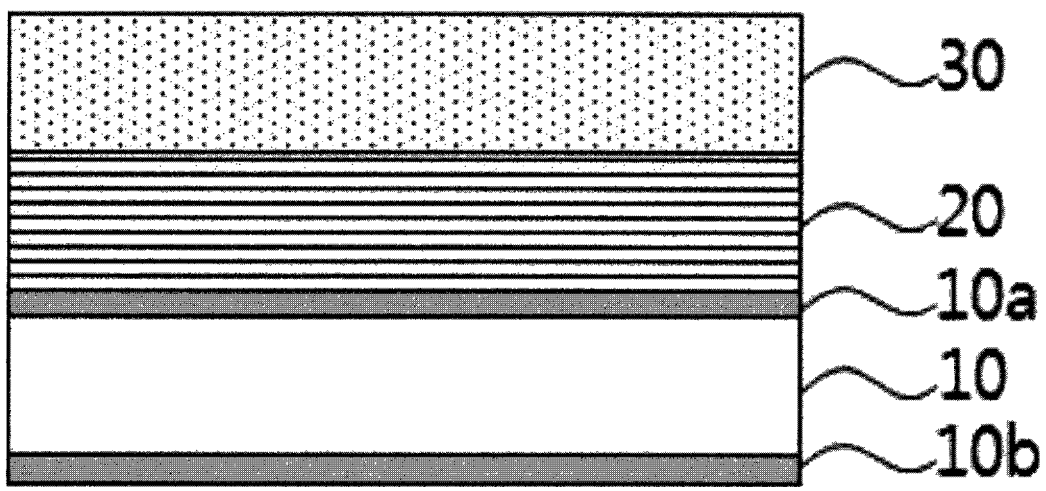

METHOD FOR MANUFACTURING LITHIUM ELECTRODE

TECHNICAL FIELD

This application claims priority to and the benefits of Korean Patent Application No. 10-2017-0094471, filed with the Korean Intellectual Property Office on Jul. 26, 2017, the entire contents of which are incorporated herein by reference.

The present invention relates to a method for preparing a lithium electrode.

BACKGROUND ART

Until recently, there have been considerable interests in developing high energy density batteries using lithium as a negative electrode. For example, compared to other electrochemical systems having a lithium-inserted carbon electrode and a nickel or cadmium electrode reducing battery energy density by increasing a weight and a volume of a negative electrode with the presence of non-electroactive materials, lithium metal has low weight and high capacity properties, and therefore, has attracted much attention as a negative electrode active material of an electrochemical battery. A lithium metal negative electrode, or a negative electrode including mainly lithium metal provides an opportunity to form batteries that are lighter and have higher energy density compared to batteries such as lithium-ion, nickel metal hydride or nickel-cadmium batteries. Such characteristics are highly preferred with batteries for portable electronic devices such as mobile phones and lap-top computers wherein premiums are paid in low weights.

Existing lithium ion batteries have energy density of approximately 700 wh/l using graphite in a negative electrode, and lithium cobalt oxide (LCO) in a positive electrode. However, with recent expansion of fields requiring high energy density, needs to increase energy density of lithium ion batteries have been constantly raised. For example, energy density needs to be increased in order to increase a driving distance of electric vehicles to 500 km or longer on a single charge.

In order to increase energy density of a lithium ion battery, use of a lithium electrode have increased. However, lithium metal is a metal highly reactive and difficult to handle, and has a problem of handling being difficult in a process.

In order to resolve such a problem, various attempts have been made to prepare electrodes using lithium metal.

For example, Korean Patent No. 0635684 relates to a method for forming a lithium electrode having a glass protective layer, and discloses a method for preparing a lithium electrode by forming a protective layer on a releasing agent layer-deposited substrate (PET), depositing lithium on the protective layer, and then depositing a current collector on the lithium, however, the lithium surface is exposed during the lithium deposition process increasing a thickness of an oxide layer (native layer), which may adversely affect lifetime properties of a battery.

Accordingly, development of technologies on methods for preparing a lithium electrode having a small and uniform thickness by minimizing oxide layer formation through protecting lithium from moisture and the open air when preparing a lithium electrode has been continuously required.

PRIOR ART DOCUMENTS

Patent Documents (Patent Document 1) Korean Patent No. 0635684, "Method for Forming Encapsulated Lithium Electrode Having Glass Protective Layer"

(Patent Document 2) Korean Patent Application Laid-Open Publication No. 2017-0026098, "Lithium Metal Battery Including Lithium Metal Anode, Method of Preparing the Lithium Metal Anode, and Protective Layer Prepared According to the Method"

DISCLOSURE

Technical Problem

As a result of extensive studies in view of the above, the inventors of the present invention have identified that, a lithium electrode having a thin and uniform thickness may be prepared by forming a protective layer capable of protecting lithium metal on a substrate first, depositing lithium metal on the protective layer, and then transferring the result on a Cu current collector when preparing a lithium electrode, and a lithium secondary battery using the lithium electrode prepared as above has enhanced energy density.

Accordingly, an aspect of the present invention provides a lithium electrode having a uniform and thin thickness by minimizing oxide layer formation.

Another aspect of the present invention provides a method for preparing a lithium electrode having a uniform and thin thickness by minimizing oxide layer formation on a lithium metal surface through preventing the lithium metal from being exposed to moisture and the open air during a manufacturing process.

Technical Solution

According to an aspect of the present invention, there is provided a method for preparing a lithium electrode including (S1) forming a protective layer by coating a polymer for protecting lithium metal on at least a first surface of a substrate; (S2) forming a lithium metal layer by depositing lithium metal on the protective layer; and (S3) transferring the lithium metal layer with the protective layer on a current collector.

The substrate may comprise one or more types selected from the group consisting of polyethylene terephthalate (PET), polyimide (PI), poly(methyl methacrylate) (PMMA), cellulose tri-acetate (TAC), polypropylene, polyethylene and polycarbonate.

The substrate may have a release layer formed on at least the first surface.

The release layer may comprise one or more types selected from the group consisting of Si, melamine and fluorine.

On at least the first surface of the substrate, an oligomer block coating may be coated.

The deposition may be performed using a method selected from the group consisting of a vacuum deposition method (also referred to as evaporation deposition), a chemical vapor deposition method (CVD) and a physical vapor deposition method.

The lithium metal layer may have a thickness of 5 µm to 50 µm.

The protective layer may comprise one or more types selected from the group consisting of polyvinylidene fluoride (PVDF), a polyvinylidene fluoride-hexafluoroethylne (PVDF-HFP) copolymer, a cycloolefin copolymer and styrene butadiene rubber-carboxymethyl cellulose (SBR-CMC).

The current collector may include one type selected from the group consisting of copper, aluminum, nickel, titanium, baked carbon and stainless steel.

The lithium electrode may comprise the current collector; the lithium metal layer formed on the current collector; and the protective layer formed on the lithium metal layer.

Advantageous Effects

According to the present invention, a lithium electrode in which a current collector, a lithium metal layer and a protective layer are consecutively laminated can be prepared using a method of, for preparing the lithium electrode, depositing lithium metal on a lithium metal protective layer, and then transferring the result on a current collector.

In addition, a lithium electrode having a thin and uniform thickness can be prepared by minimizing oxide layer formation on a lithium metal surface through preventing the lithium metal from being exposed to an external environment such as moisture and the open air by the protective layer during a manufacturing process.

Furthermore, by using a method of forming a lithium metal layer on a current collector through transferring instead of directly depositing lithium metal on a current collector, a problem of a current collector being readily broken during a deposition process can be compensated, and as a result, a lithium electrode can be prepared using various types of current collectors.

DESCRIPTION OF DRAWINGS

The FIGURE is a mimetic diagram illustrating a lithium electrode laminate before transferring on a current collector in a process for preparing a lithium electrode according to the present invention.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Method for Preparing Lithium Electrode

The present invention relates to a method for preparing a lithium electrode capable of increasing energy density of a battery, and the method comprises (S1) forming a protective layer by coating a polymer for protecting lithium metal on a substrate; (S2) forming a lithium metal layer by depositing lithium metal on the protective layer; and (S3) transferring the lithium metal layer on a current collector.

The FIGURE is a mimetic diagram illustrating a lithium electrode laminate before transferring on a current collector in a process for preparing a lithium electrode according to the present invention.

When referring to the FIGURE, in the lithium electrode, a protective layer (20) and a lithium metal layer (30) are consecutively formed on a substrate (10) having a release layer (10a, 10b) formed on both surfaces, and then the result may be transferred on a current collector (not shown).

Hereinafter, the present invention will be described in more detail for each step.

Step (S1)

In step (S1), a protective layer for protecting lithium metal may be formed by coating a polymer for protecting lithium metal on a substrate.

The substrate may be a material capable of enduring a process condition such as a high temperature in a step of depositing lithium metal, and capable of preventing a problem of reverse peel-off, which is, during a winding process for transferring a deposited lithium metal layer on a current collector, the lithium metal layer being transferred on the substrate instead of the current collector.

For example, the substrate may include one or more types selected from the group consisting of polyethylene terephthalate (PET), polyimide (PI), poly(methyl methacrylate) (PMMA), cellulose tri-acetate (TAC), polypropylene, polyethylene and polycarbonate.

In addition, the substrate may have a release layer formed on at least one surface, and preferably may have a release layer formed on both surfaces. By the release layer, a problem of reverse peel-off, which is, during a winding process for transferring a deposited lithium metal layer on a current collector, the lithium metal layer being transferred on the substrate instead of the current collector may be prevented, and in addition thereto, the substrate may be readily separated after transferring the lithium metal layer on the current collector.

The release layer may include one or more types selected from the group consisting of Si, melamine and fluorine.

The release layer may be formed using a coating method, and although the coating method may be selected from the group consisting of, for example, dip coating, spray coating, spin coating, die coating and roll coating, the coating method is not limited thereto, and coating methods that may be used for forming a coating layer in the art may be diversely used.

In addition, the substrate may include an oligomer block coating on at least one surface. Herein, the oligomer block coating means a barrier for preventing oligomer migration caused by oligomers remaining in the substrate without being polymerized escaping outside the substrate and contaminating lithium.

For example, unpolymerized oligomers may be present in a PET film, and these oligomers may migrate outside the PET film and contaminate lithium, and therefore, the oligomer block coating may be formed on at least one surface of the PET film in order to prevent this phenomenon.

In addition, having a lower oligomer content in the substrate may be advantageous since the problem of the oligomer escaping from the substrate may be prevented.

Step (S2)

In Step (S2), a lithium metal layer may be formed by depositing lithium metal on the protective layer.

In the present invention, the protective layer protects lithium metal from an external environment such as moisture or the open air in a series of processes preparing a lithium electrode, and may minimize formation of a surface oxide layer (native layer).

Accordingly, materials forming the protective layer need to have a high moisture-blocking ability, have stability for an electrolyte liquid, have a high electrolyte liquid moisture content, and have excellent oxidation-reduction stability.

For example, the protective layer may include one or more types of polymers selected from the group consisting of polyvinylidene fluoride (PVDF), a polyvinylidene fluoride-hexafluoroethylne (PVDF-HFP) copolymer, a cycloolefin copolymer and styrene butadiene rubber-carboxymethyl cellulose (SBR-CMC). Preferably, the polymer may be PVDF.

The protective layer may have a thickness of 0.1 µm to 1.0 µm, preferably 0.3 µm to 0.8 µm, and more preferably 0.4 µm to 0.6 µm. When the thickness of the protective layer is less than the above-mentioned range, a function of exposing the lithium metal from moisture or the open air may decline, and when the thickness is greater than the above-mentioned range, the prepared lithium electrode may become thick.

A coating solution for forming the protective layer may be prepared by dissolving the polymer as described above in a solvent, and herein, the coating solution may have a concentration of 1% to 20%, preferably 3% to 10%, and more preferably 4% to 8%. When the concentration of the coating solution is less than the above-mentioned range, viscosity is very low making the coating process difficult to proceed, and when the concentration is greater than the above-mentioned range, viscosity is high making it difficult to form the coating layer to a target coating thickness. Herein, the solvent for forming the coating solution may be one or more types selected from the group consisting of N-methyl-2-pyrrolidone (NMP), dimethylformamide (DMF), dimethylacetamide (DMAc), tetramethyl urea, dimethyl sulfoxide (DMSO) and triethyl phosphate. Particularly, when using NMP, solubility of the polymer for forming the protective layer as described above is high, and forming the protective layer using a coating process may be advantageous.

In addition, a coating method for forming the protective layer may be selected from the group consisting of dip coating, spray coating, spin coating, die coating, roll coating, slot-die coating, bar coating, gravure coating, comma coating, curtain coating and micro-gravure coating, but is not limited thereto, and coating methods that may be used for forming a coating layer in the art may be diversely used.

In the present invention, the lithium metal layer formed on the protective layer by deposition may have a thickness of 5 µm to 25 µm, preferably 10 µm to 20 µm, and more preferably 13 µm to 18 µm. The thickness of the lithium metal layer may vary depending on the application, and when using only lithium metal as an electrode, for example, a negative electrode material, the thickness of the lithium metal layer is sufficient when it is approximately µm to 25 µm, however, when using lithium metal as a material for compensating irreversibility occurring in a negative electrode made of silicon oxide, the lithium metal layer may have a thickness of approximately 5 µm to 15 µm. When the thickness of the lithium metal layer is less than the above-mentioned range, battery capacity and lifetime properties may decline, and when the thickness is greater than the above-mentioned range, the thickness of a prepared lithium electrode becomes large, which is disadvantageous for commercialization.

In the present invention, a deposition method for depositing the lithium metal may be selected from among a vacuum deposition method (evaporation deposition), chemical vapor deposition method (CVD) and a physical vapor deposition method, but is not limited thereto, and deposition methods used in the art may be diversely used.

Step (S3)

In Step (S3), the lithium metal layer may be transferred on a current collector. Herein, the transfer may be carried out by winding a structure in which the substrate, the protective layer and the lithium metal layer are consecutively laminated, and transferring the lithium metal layer on a current collector using a device such as a roll press.

In the present invention, the current collector may be one type selected from the group consisting of copper, aluminum, nickel, titanium, baked carbon and stainless steel.

Directly depositing lithium metal on a current collector, particularly, directly depositing lithium metal on a copper current collector has a problem of the copper current collector being readily broken, however, in the present invention, a lithium electrode is prepared by, after forming a lithium metal layer, transferring the formed lithium metal layer itself on a current collector, and therefore, a lithium electrode may be prepared using various current collectors.

According to the method for preparing a lithium electrode as described above, a lithium electrode in which a current collector, a lithium metal layer and a protective layer are consecutively laminated may be prepared by using a method of depositing lithium metal on a lithium metal protective layer and then transferring the result on a current collector to prepare the lithium electrode.

In addition, a lithium electrode having a thin and uniform thickness may be prepared by minimizing oxide layer (native layer) formation on a lithium metal surface through preventing the lithium metal from being exposed to an external environment such as moisture and the open air by the protective layer during a manufacturing process.

Furthermore, by using a method of forming a lithium metal layer on a current collector through transferring instead of directly depositing lithium metal on a current collector, a problem of a current collector being readily broken during a deposition process may be compensated, and as a result, a lithium electrode may be prepared using various types of current collectors.

In addition, the lithium electrode prepared as above has excellent thickness uniformity while having a small thickness and therefore, may greatly enhance energy density when used in a battery.

Hereinafter, preferred examples are provided in order to illuminate the present invention, however, the following examples are for illustrative purposes only, and it is obvious to those skilled in the art that various modifications and changes may be made within the scope of the category and technological ideas of the present invention, and such modifications and changes also fall within the scope of the attached claims.

Example 1: Preparation of Lithium Electrode

As a substrate, a release PET film (manufactured by SKC hi-tech & marketing (former SKC Haas) RX12G 50 µm) having a release layer formed on both surfaces was prepared.

On one surface of the substrate, a PVDF-HFP coating solution was prepared as a coating solution for forming a protective layer for protecting lithium metal. The PVDF-HFP coating solution was prepared as a 5% solution by dissolving PVDF-HFP (manufactured by Arkema LBG Grade) in an NMP solvent.

The PVDF-HFP coating solution was coated on one surface of the release PET film to a thickness of 2 µm using a micro-gravure coater to form a PVDF-HFP protective layer.

A lithium metal layer having a thickness of 20 µm was formed by depositing lithium metal on the protective layer using a vacuum deposition method (evaporation deposition) at a temperature of 600° C., and a structure in which the release PET film, the PVDF-HFP protective layer and the lithium metal layer are consecutively laminated was wound at a rate of 1 m/min.

After that, the lithium metal layer was transferred on a Cu current collector using a roll press machine (calendering machine CLP-1015, manufactured by CIS) to prepare a lithium electrode in which the Cu current collector, the lithium metal layer and the PVDF-HFP protective layer are consecutively laminated.

Example 2: Preparation of Lithium Electrode

A PVDF protective layer was formed in the same manner as in Example 1 except that PVDF was used instead of PVDF-HFP as the polymer for forming a protective layer.

Comparative Example 1: Preparation of Lithium Electrode by Directly Depositing on Current Collector After forming a lithium metal layer by directly depositing lithium metal on a Cu current collector, a PVDF-HFP coating solution was coated on the lithium metal layer to prepare a lithium electrode. Herein, the deposition process was conducted using a vacuum deposition method (evaporation deposition) at a temperature of 600° C. to form a lithium metal layer having a thickness of 12 μm, and the PVDF-HFP coating solution was prepared as a 5% solution by dissolving PVDF-HFP (manufactured by Arkema LBG Grade) in an NMP solvent, and a PVDF-HFP protective layer was formed on the lithium metal layer by spin coating.

Comparative Example 2: Preparation of Lithium Electrode by Rolling

As a lithium metal layer, lithium metal (Honjo Metal Co., Ltd., Japan) manufactured by rolling was prepared.

A PVDF-HFP coating layer was coated on the lithium metal layer to prepare a lithium electrode. Herein, the PVDF-HFP coating solution was prepared as a 5% solution by dissolving PVDF-HFP (manufactured by Arkema LBG Grade) in an NMP solvent, and by forming a PVDF-HFP protective layer on the lithium metal layer through spin coating, a lithium electrode in which a Cu current collector, the lithium metal layer and the PVDF-HFP protective layer are consecutively laminated was prepared.

Comparative Example 3: Preparation of Lithium Electrode by Electroplating

To a solution of dissolving 2 M lithium chloride in tetrahydrofuran (THF) (2 M Cl in THF), copper foil (2 cm×2 cm) having a thickness of 20 μm as a main electrode, a Pt wire as a counter electrode, and magnesium foil as a reference electrode were immersed.

After that, an electroplating reaction was progressed for 1 hour at 5 mA to form a lithium metal layer on copper foil.

A PVDF-HFP coating layer was coated on the lithium metal layer to prepare a lithium electrode. Herein, the PVDF-HFP coating solution was prepared as a 5% solution by dissolving PVDF-HFP (manufactured by Arkema LBG Grade) in an NMP solvent, and by forming a PVDF-HFP protective layer on the lithium metal layer through spin coating, a lithium electrode was prepared.

Experimental Example 1: Comparison of Prepared Lithium Electrodes

In Examples 1 and 2, preparation of normal lithium electrodes was identified.

On the other hand, in Comparative Example 1, an occurrence of wrinkle phenomenon caused from conducting a direct deposition process on the Cu current collector was identified. A wrinkle phenomenon is a phenomenon of folding and tearing, and it was seen that such a phenomenon occurred by conducting a direct deposition process on the thin Cu current collector.

Experimental Example 2: Comparison of Cycle Performance

A Hohsen 2032 coin cell was manufactured using each of the lithium electrodes prepared in Example 1 and Comparative Examples 2 and 3 as a negative electrode, and cycle performance thereof was compared. LF-X2ON manufactured by LNF was used as a positive electrode, and, as an electrolyte liquid, a material obtained by adding 1 M LiPF6 and 1 wt % vinylene carbonate (VC) to a solution mixing fluoroethylene carbonate (FEC) and dimethyl carbonate (DMC) in a ratio of 2:8 vol % was used. LC2001 of SK innovation Co., Ltd. was used as a separator. Charge proceeded under a condition of 4.25 V CC/CV, and discharge proceeded under a condition of 3.0 V CC. C-rates during the charge and the discharge were 0.2 C and 0.5 C, respectively.

TABLE 1

|  | Cycle Number (n) | Negative Electrode Efficiency [%] |
|---|---|---|
| Example 1 | 260 | 99.27 |
| Comparative Example 2 | 150 | 98.98 |
| Comparative Example 3 | 150 | 98.71 |

In the table, the cycle number was based on the cycle number at which discharge capacity ratio decreased to approximately 80% with respect to initial discharge capacity. An equation of calculating the negative electrode efficiency is as in the following Equation 1.

[Equation 1]

$$\text{Negative electrode efficiency}[\%] = \left(1 - \frac{\text{Positive electrode capacity} + \text{Negative electrode capacity} - \text{Capacity at which discharge capacity decreased to 80\% \textit{gative} electrode}}{\text{Sum of total discharge capacity until discharge capacity decreased to 80\%}}\right) \times 100$$

Hereinbefore, the present invention has been described with reference to limited examples and drawings, however, the present invention is not limited thereto, and by those skilled in the art, various changes and modifications may be made within technological ideas of the present invention and the range of equivalents of the attached claims.

REFERENCE NUMERAL

10: Substrate
10a, 10b: Release Layer
20: Protective Layer
30: Lithium Metal Layer

The invention claimed is:

1. A method for preparing a lithium electrode comprising:
   (S1) forming a release layer on a first surface of a substrate and forming a release layer on a second surface of the substrate,
   wherein the release layer comprises one or more types selected from the group consisting of Si, melamine and fluorine;
   (S2) forming a protective layer on the release layer formed on the first surface of the substrate,
   wherein the protective layer is consisting of one or more types selected from the group consisting of polyvinylidene fluoride (PVDF), a polyvinylidene fluoride-hexafluoroethylene (PVDF-HFP) copolymer, a cycloolefin copolymer and styrene butadiene rubber-carboxymethyl cellulose (SBR-CMC);
   (S3) forming a lithium metal layer by depositing lithium metal on the protective layer; and
   (S4) winding a structure formed by subsequently laminating the substrate, the protective layer and the lithium metal layer and then transferring the structure on a current collector using a roll press for the lithium metal layer of the structure to be on the current collector.

2. The method for preparing the lithium electrode of claim 1, wherein the substrate comprises one or more types selected from the group consisting of polyethylene terephthalate (PET), polyimide (PI), poly(methyl methacrylate) (PMMA), cellulose tri-acetate (TAC), polypropylene, polyethylene and polycarbonate.

3. The method for preparing the lithium electrode of claim 1, wherein an oligomer block coating is coated on at least the first surface of the substrate.

4. The method for preparing the lithium electrode of claim 1, wherein depositing lithium metal on the protective layer is performed using a method selected from the group consisting of a vacuum deposition method, chemical vapor deposition method (CVD) and a physical vapor deposition method.

5. The method for preparing the lithium electrode of claim 1, wherein the lithium metal layer has a thickness of 5 μm to 50 μm.

6. The method for preparing the lithium electrode of claim 1, wherein the current collector comprises one type selected from the group consisting of copper, aluminum, nickel, titanium, baked carbon and stainless steel.

7. The method for preparing the lithium electrode of claim 1, the lithium electrode comprising:
   the current collector;
   the lithium metal layer formed on the current collector; and
   the protective layer formed on the lithium metal layer.

* * * * *